United States Patent [19]

Ito et al.

[11] Patent Number: 4,513,808

[45] Date of Patent: Apr. 30, 1985

[54] AUTOMOBILE AIR CONDITIONER

[75] Inventors: Tosikazu Ito, Ibaraki; Reijiro Takahashi, Katsuta, both of Japan

[73] Assignee: Hitachi, Ltd., Tokyo, Japan

[21] Appl. No.: 343,591

[22] Filed: Jan. 28, 1982

[30] Foreign Application Priority Data

Feb. 4, 1981 [JP] Japan .................................. 56-14255

[51] Int. Cl.$^3$ ........................ B60H 3/00; B61D 27/00; F25B 29/00

[52] U.S. Cl. ......................................... 165/43; 165/42; 165/103; 62/239; 62/244; 98/2.01

[58] Field of Search ...................... 165/40, 42, 43, 103; 62/239, 244; 98/2.01

[56] References Cited

U.S. PATENT DOCUMENTS

| | | | |
|---|---|---|---|
| 3,656,541 | 4/1972 | Coyle et al. | 165/42 |
| 3,934,642 | 1/1976 | Coulson et al. | 165/42 |
| 3,948,312 | 4/1976 | Nisbet | 165/42 |
| 4,125,150 | 11/1978 | Zelger et al. | 165/42 |
| 4,223,720 | 9/1980 | Poirier d'Ange d'Orsay et al. | 165/43 |
| 4,337,821 | 7/1982 | Saito | 165/42 |
| 4,340,112 | 7/1982 | Sutoh et al. | 165/42 |

FOREIGN PATENT DOCUMENTS

| | | | |
|---|---|---|---|
| 110614 | 8/1980 | Japan | 165/43 |
| 123520 | 9/1980 | Japan | 165/43 |

*Primary Examiner*—William R. Cline
*Assistant Examiner*—John K. Ford
*Attorney, Agent, or Firm*—Antonelli, Terry & Wands

[57] ABSTRACT

An automobile air conditioner of a reheat air mix type, having an evaporator disposed in a duct and a heater core disposed in the duct at the downstream side of the evaporator. Chilled air passages are formed between both sides of the heater core and the surfaces of opposing walls of the duct. The chilled air passages are extended to form a first duct leading to an upper air outlet to the room of automobile and a second duct leading to a lower air outlet opening to the room. A part of the warmed air coming from the heater core is delivered to the first duct while the other part is delivered to the second duct. The air conditioner further has a first air mix damper for controlling the ratio between the flow rate of chilled air flowing into the heater core and the flow rate of the chilled air flowing into the first duct, and a second air mix damper for controlling the ratio between the flow rate of chilled air introduced into the second duct and the flow rate of warmed air flowing from the heater core into the second duct.

9 Claims, 4 Drawing Figures

A 5a 9a 7a 20 2 31 8b 5b 51 52 3 32 53 5c 21 9b 8a 7b

AUTOMOBILE AIR CONDITIONER

BACKGROUND OF THE INVENTION

The present invention relates to an air conditioner for automobiles and, more particularly, to an automobile air conditioner having an air conditioning system of the reheat air mix type and provided with two air outlets for blowing the heated or cooled air to the upper section and lower section of the compartment, i.e. to the upper part and lower part of the driver, respectively.

The conventional air temperature controller of the air conditioner of this kind could not provide a temperature difference between the air blown out from the upper air outlet and the air blown out from the lower air outlet.

To obviate this problem, Japanese Utility Model Publication No. 9704/1977, for example, discloses a system in which the conditioned air is discharged from an upper air outlet (chilled air outlet) and a lower air outlet (warm air outlet) at a suitable ratio of flow rate, wherein a part of the chilled air which has passed an evaporator of refrigeration cycle is directly introduced into the duct leading to the upper air outlet to mix the chilled air to the conditioned air flowing through the duct to thereby obtain a temperature difference between the flows of air from both air outlets.

Also, Japanese Utility Model Publication No. 9781/1973 discloses a system in which a chilled air passage is provided at the upstream side of a heater core. The chilled air passage is adapted to introduce a part of the chilled air supplied by a blower to the upper air outlet. A part of the heated air is introduced into the chilled air passage so as to be mixed with the chilled air flowing through the latter to thereby establish the temperature difference of the air discharged from the upper and lower air outlets.

These known arrangements, however, suffer the following disadvantages. Namely, in the air conditioning system of the first mentioned type, it is necessary to employ three dampers for controlling the temperatures of the air from the upper and lower air outlets, i.e. a mix damper, air outlet section damper and a chilled air damper. Consequently, the size of the unit is increased impractically and the construction of the system as a whole is complicated.

The second type of air conditioning system mentioned above is also inconvenient in that it requires four dampers, namely a temperature controlling valve for adjusting the temperature of warm air after flowing through a heat exchanger, two chilled air temperature control valves for controlling the temperature of air discharged from the chilled air outlet and an air shut-off valve. In addition, this arrangement cannot provide such an operation mode that the whole of the chilled air is discharged from the chilled air outlet. This point is a fatal disadvantage for the air conditioner having cooling function.

SUMMARY OF THE INVENTION

Accordingly, an object of the invention is to provide a small-sized automobile air conditioner in which the temperature difference between the controlled air discharged from the upper air outlet and the controlled air discharged from the lower air outlet can be controlled as desired by only a pair of dampers.

To this end, according to one aspect of the invention, an automobile air conditioner is provided which includes a heater core, a main chilled air passage, and a sub-chilled air passage disposed around the heater core so as to by-pass the heater core. A main warm air passage are and a sub-warm air passage connected to the outlet side of the heater core, with the main chilled air passage and the sub-warmed air passage joining each other and leading to an upper air outlet, while the sub-chilled air passage and the main warm air passage join each other and lead to a lower air outlet. A first air mix door is adapted to control the ratio between the flow rate of chilled air flowing into the main chilled air passage and the flow rate of the chilled air flowing into the heater core, and a second air mix door is adapted to control the ratio of mixing of the chilled air coming from the sub-chilled air passage and the warm air coming from the main warm air passage.

Another object of the invention is to provide an automobile air conditioner capable of maintaining a predetermined temperature difference between the conditioned air discharged from the upper air outlet and the conditioned air discharged from the lower air outlet.

To this end, according to another aspect of the invention, an automobile air conditioner is provided which includes a controlling mechanism adapted to control the second air mix door in accordance with the state of control of the first air mix door.

Yet still another object of the invention is to provide an automobile air conditioner of the kind described, in which two air mix doors for controlling the controlled air flowing in an upper outlet duct and the controlled air flowing in a lower outlet duct are disposed in a compact manner within a unit case.

To this end, according to a further aspect of the invention, an automobile air conditioner is provided which includes a heater core having an air inlet surface and an air outlet surface respectively spaced from the inner surfaces of a duct by a first gap and a second gap, with the first gap constituting a first chilled air passage while the second gap constitutes a second chilled air passage. First and a second warm air passages are disposed at the outlet side of the heater core such that the flow of air coming out of the heater core is branched into the first and second warm air passages. The first chilled air passage and the second warm air passage join each other and lead to an upper air outlet while the second chilled air passage and the first warmed air passage join each other and lead to a lower air outlet. A first air mix door is disposed in the first gap and adapted to control the ratio between the flow rate of chilled air flowing into the first chilled air passage and the flow rate of chilled air flowing into the heater core, with a second air mix door being disposed in the second gap and being adapted to control the ratio of mixing between the chilled air coming from the second chilled air passage and the warm air coming from the first warm air passage.

Other objects, features and advantages of the invention will become clear from the following description of the preferred embodiments taken in conjunction with the accompanying drawings.

DESCRIPTION OF THE PREFERRED EMBODIMENTS

Figure 1:
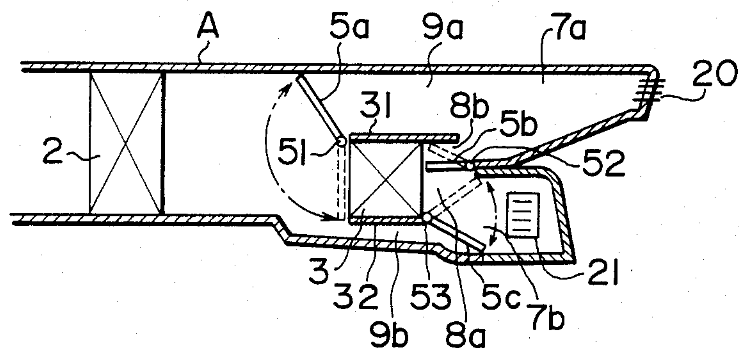
FIG. 1 is an illustration for explaining the principle of an automobile air conditioner in accordance with the invention.

Referring now to the drawings wherein like reference numerals are used throughout the various views to designate like parts and, more particularly, to FIG. 1, according to this figure, an evaporator 2 is adapted to chill the ambient air, room air or the mixture of ambient air and room air which is supplied thereby by a blower not shown. A heater core 3 is adapted to heat the air chilled and dehumidified by the evaporator 2. The evaporator 2 and the heater core 3 are disposed in a duct A in the mentioned order. The heater core 3 is supported by walls 31 and 32 provided in the duct A. A main chilled air passage 9*a* is formed between the wall 31 and the inner surface of the duct, while a sub-chilled air passage 9*b* is formed between the wall 32 and the inner surface of the duct. The chilled air passages 9*a* and 9*b* are so sized and arranged that, when the chilled air which has passed through the evaporator 2 bypasses the heater core 3, the chilled air is distributed to the main and sub-chilled air passages 9*a* and 9*b* at a ratio of 8:2.

A first air mix door 5*a* is adapted to control the ratio between the flow rate of chilled air flowing into the heater core 3 and the flow rate of the chilled air flowing into the main chilled air passage 9*a*.

The first air mix door 5*a* is fixed to a shaft 51 rotatably secured to the end of the chilled air inlet surface of the heater core 3 adjacent to the main chilled air passage 9*a*, and is swingable between a first position (shown by full line) fully closing the main chilled air passage 9*a* and a second position (shown by broken line) fully closing the inlet surface of the heater core 3.

A control door 5*b* is adapted to control the ratio of distribution of the warm air coming out from the heater core 3 to the main and sub-warm air passages 8*a* and 8*b*. The control door 5*b* is mounted on a shaft 52 rotatably carried by the duct A.

The control door 5*b* is rotatably between the position shown by full line and the position shown by broken line to control the areas of the main and sub-warm air passages 8*a* and 8*b* within the region of rotation thereof.

A second air mix door 5*c* is adapted to control the ratio of mixing between the warm air coming from the main warm air passage 8*a* and the chilled air coming from the sub-chilled air passage 9*b*. The second air mix door 5*c* is mounted on a shaft 53 rotatably secured to the end of the warm air outlet surface of the heater core adjacent to the sub-chilled air passage 9*b*. The second air mix door 5*c* is swingable between the position shown by full line and the position shown by broken line to control the ratio of mixing of the warm air coming from the main warm air passage 8*a* and the chilled air coming from the sub-chilled air passage 9*b*.

A chilled air duct 7*a* is adapted to mix the chilled air from the main chilled air passage 9*a* and the warm air from the sub-warm air passage 8*b* and to introduce the mixture to an upper air outlet 20. A warm air duct 7*b* is adapted to mix the warm air from the main warm air passage 8*a* and the chilled air coming from the sub-chilled air passage 9*b* and to introduce the mixture to a lower air outlet 21.

The operation of the air conditioner of the invention having the described construction is as follows.

When the first and second air mix doors 5*a* and 5*c* and the control door 5*b* take the positions shown by full lines, the air conditioner is in the condition for the strongest warming of the passenger compartment automobile. Namely, a door (not shown) for introducing external and internal air takes the position for introducing the external air, and the blower is rotating at the highest speed. The refrigeration cycle does not operate in this state.

The external air which has passed through the evaporator 2 now having no chilling effect is introduced into the heater core 3 so as to be heated thereby. The heated air is then discharged through both of the main and sub-warm air passages 8*a* and 8*b* and is distributed to the lower air outlet 21 and the upper air outlet 20 through the warm air duct 7*b* and the chilled air duct 7*a*, respectively.

Assume that the first air mix door 5*a* is gradually shifted toward the position shown in broken line while fixing the control door 5*b* and the second air mix door at the positions shown by full line. As a result, the flow rate of chilled air coming into the chilled air duct 7*a* through the main chilled air passage 9*a* is increased gradually, so that the temperature of the conditioned air discharged from the upper outlet gradually becomes lower than the temperature of the warm air discharged from the lower air outlet. It is, therefore, possible to warm up the whole part of the passenger compartment while supplying properly chilled air from the upper air outlet.

In the above described embodiment, it is possible to lower the temperature of the chilled air from the upper air outlet while maintaining the flow rate of air of chilled air in the main chilled air passage 9*a* constant, by moving the control door 5*b* towards the position shown by broken lines.

The temperature difference between the air discharged from the upper air outlet 20 and the air discharged from the lower air outlet 21 is maximized when the control door 5*b* fully closes the sub-warm air passage 8*b*.

When the driver wishes to slightly lower the air temperature in the leg area of the vehicle, it is only necessary to simply move the second air mix door 5*c* towards the position of broken line, so that the flow rate of warm air coming from the main warm air passage 8*a* is gradually decreased while the flow rate of the chilled air from the sub-chilled air passage 9*b* is gradually increased to lower the temperature of the conditioned air discharged from the lower air outlet 21.

When the driver wishes to lower the temperature in the whole passenger compartment, it is only necessary to move the first air mix door 5*a* further towards the position of broken line and lower the speed of the blower correspondingly.

By so doing, the flow rate of the chilled air flowing into the heater core 3 is decreased to lower the flow rate of warm air delivered to the main and sub-warm air passages from the heater core, while the flow rate of chilled air discharged from the upper air outlet past the main chilled air passage 9*a* is increased. Consequently, the heating effect is suppressed to lower the temperature of whole space in the room.

In the dehumidifying warming mode of the air conditioner, the room air and the ambient air are sucked substantially at an equal rate. Even in this state, the temperature of the conditioned air from the upper air outlet 20 and the lower air outlet 21 are controlled by controlling the opening degrees of the first and the second air mix doors 5*a* and 5*c*.

It is also possible to control simultaneously the temperatures of conditioned air from the upper and lower air outlets 20 and 21, by controlling the opening degree of the control door 5*b* while fixing the first and the second air mix doors 5*a* and 5*c* at intermediate positions.

In the cooling mode of operation of the air conditioner, the circulation of hot water through the heater core 3 is stopped, and the first air mix door 5*a* is moved to the position shown by the broken line. Therefore, the whole part of the chilled air chilled by the evaporator 2 is discharged from the upper air outlet 20 via the main chilled air passage 9*a*.

However, as the second air mix door 5*c* is moved to the position shown by broken lines, a part of the chilled air is discharged also from the lower air outlet 21 via the sub-chilled air passage 9*b*.

The first and the second air mix doors 5*a* and 5*c* may be controlled independently of each other or the opening degree of the second air mix door 5*c* may be controlled in accordance with the opening degree of the first air mix door 5*a*. It is also possible to control both air mix doors 5*a*,5*c* electrically in accordance with the temperature difference between the air discharged from the upper air outlet and the air discharged from the lower air outlet, so as to maintain a constant temperature difference. These ways of control of the first and second air mix doors 5*a*, 5*c* will be explained more fully hereinbelow. It is further possible to control the control door 5*b* independently or in relation to the opening degree of at least one of the first and second air mix doors 5*a* and 5*c*.

Figure 2:
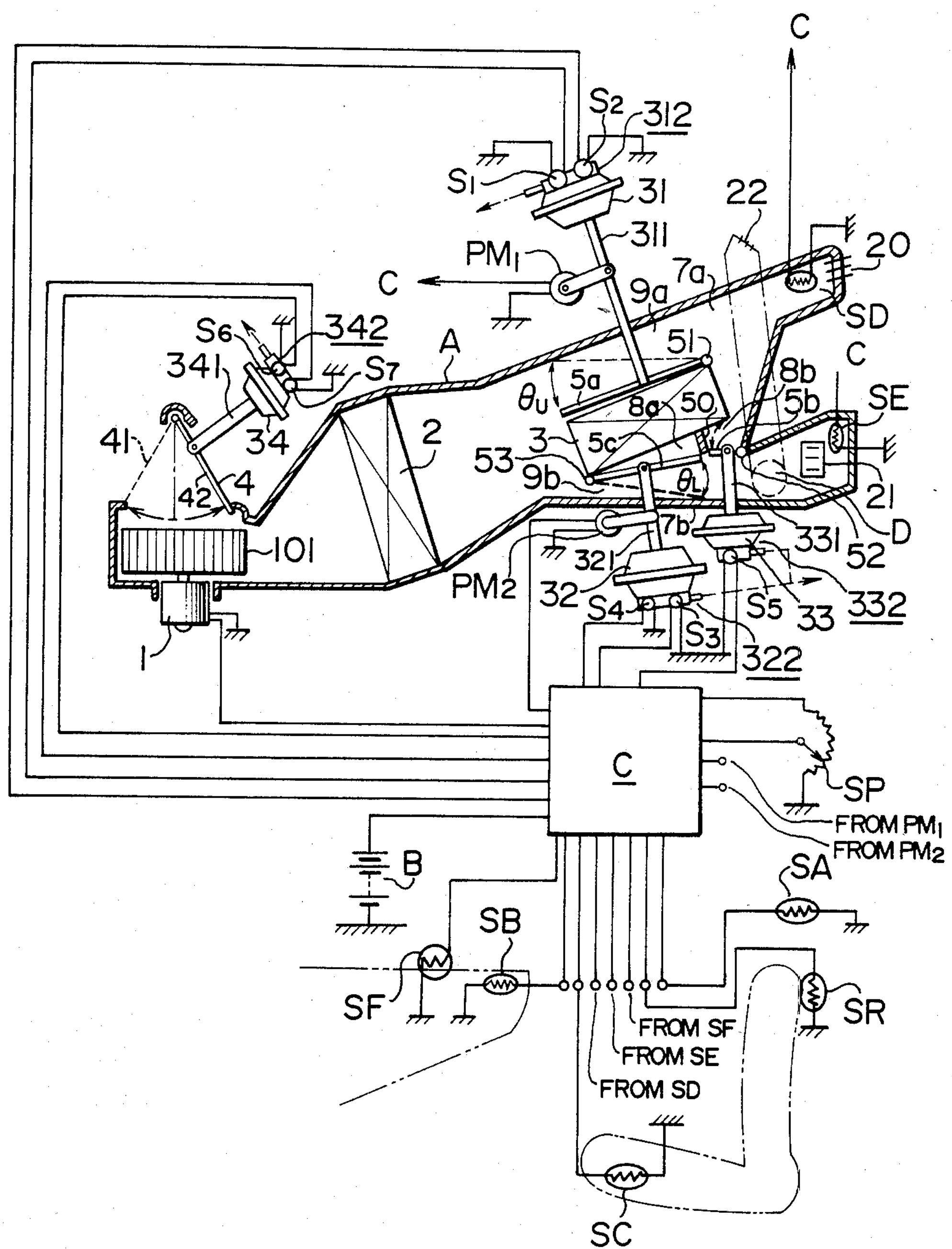
FIG. 2 shows an automobile air conditioner constructed in accordance with a first embodiment of the invention.

As shown most clearly in FIG. 2, the air conditioner, includes a fan motor 1 having a fan 101, a door 4 for switching the suction of air between ambient air and passenger compartment air and a passenger compartment air introduction port 41 and an ambient air introduction port 42 leading to the duct A.

The heater 3 is disposed in the duct A such that the inlet and outlet surfaces thereof are opposed to the inner surfaces of the duct A. The inlet surface and the opposing inner surface of the duct constitutes a gap serving as the main chilled air passage 9*a* while another gap formed between the outlet surface and the opposing inner surface constitutes a sub-chilled air passage 9*b*.

The first air mix door 5*a* has a shaft 51 fixed to the corner of the heater core 3 adjacent to the outlet side of the main chilled air passage 9*a* so that it is able to rotate between the inlet surface of the heater core 3 and the inner surface of the wall of the duct A.

The second air mix door 5*c* has a shaft 53 fixed to the corner of the heater core 3 adjacent to the inlet side of the sub-chilled air passage 9*b* and is rotatable between the outlet surface of the heater core 3 and the inner wall of the duct. By arranging the two air mix doors 5*a*, 5*c* in the described manner, it is possible to control the flow rate of air in respective chilled air passages 9*a*, 9*b* without necessitating an increase in the rotation angles of the air mix doors 5*a*, 5*c*, so that the air conditioner as a whole can be made compact.

A partition wall 50, provided at the outlet surface of the heater core 3, is adapted to divide the channel of the air from the heater core 3 into a main warm air passage 8*a* and a sub-air passage 8*b*.

The control door 5*b* has a shaft 52 supported by the duct at the outlet of the sub-warm air passage 8*b* so as to be able to rotate between the end of the partition wall 50 and the corner of the heater core 3 facing the warm air passage 8*b*.

A shunting port D leading to a defroster 22 opens into the warm air duct 7*b*. A switching door provided at the shunting port D is adapted to switch the flow of warm air between first mode in which the warm air flows to the defroster 22 and a second mode in which the warm air flows towards the lower air outlet 21.

An actuator 31 is adapted to actuate the first air mix door 5*a*, with the actuator 31 including a diaphragm (not shown) operated by vacuum, an actuating rod 311 connected at one end to the diaphragm and a vacuum control valve 312 for controlling the vacuum applied to the diaphragm. Another actuator 32 for actuating the second air mix door 5*c* has a diaphragm chamber (not shown) defined by a diaphragm, an actuating rod 321 fixed to the diaphragm and a vacuum control valve 322 adapted for controlling the vacuum applied to the diaphragm.

The vacuum control valves 312 and 322 are provided with solenoid valves $S_1$ and $S_3$ adapted to effect a switching between a state in which the atmospheric pressure is applied to the diaphragm chamber and a state in which the vacuum is applied to the diaphragm chamber. More specifically, vacuum is applied to the diaphragm chamber as the solenoids $S_1$ and $S_3$ are energized, so that the doors 5*a* and 5*c* are pulled towards the actuators 31,32 by the rods 311 and 321.

As the solenoids $S_1$ and $S_3$ are de-energized, the vacuum which has been applied to the diaphragm chamber is vented to the atmosphere, so that the spring which has been compressed by the diaphragm under application of vacuum is relieved to force the doors 5*a* and 5*c* through rods 311 and 321 to a normal position.

When the doors 5*a* and 5*c* come to take predetermined positions, the solenoid valves $S_2$ and $S_4$ are activated to close both to the atmospheric passage and the vacuum passage leading to the diaphragm chamber, so that the pressure in the diaphragm chamber is maintained at a constant level to fix the doors 5*a* and 5*c* at these positions.

An actuator 33 is adapted to actuate the control door 5*b*, with the actuator 33 including a diaphragm (not shown), a rod 331 fixed to the diaphragm, and a vacuum control valve 332 adapted to control the vacuum to be applied to the diaphragm. The vacuum control valve 332 has a solenoid-operated change-over valve $S_5$. When the valve $S_5$ is not energized by the power source, the diaphragm is deflected to the upper position as viewed in FIG. 2 by the force of a spring (not shown) so that the door 5*b* is moved to the broken line position through the rod 331. However, as the solenoid valve $S_5$ is energized, the diaphragm is deflected downward as viewed in FIG. 2 by the force of the vacuum applied thereto, so that the door 5*b* is reset to the full line position in FIG. 2 through the rod 331.

A an actuator 34 actuates the door 4 for switching the suction of air between the ambient air and room air. The actuator 34 has a diaphragm (not shown), a rod 341 fixed to the diaphragm and a vacuum change-over valve 342 adapted to control the vacuum applied to the diaphragm. The vacuum change-over valve 342 has solenoid valves $S_6$ and $S_7$ and two diaphragms spaced from each other in the axial direction of the rod 341.

When both of the solenoid valves $S_6$ and $S_7$ are de-energized, both diaphragms are deflected to the left as viewed in FIG. 2 by springs, so that the door 4 is moved to the broken-line position through the rod 341.

However, as the solenoid valve $S_6$ is energized, one of the diaphragms has vacuum applied thereto and is deflected to the right, as viewed in FIG. 2 while compressing one of the springs, so that the door 4 is pulled to the position shown by one-dot-and-dash line in the drawings by the rod 341. Then, as the solenoid $S_7$ is energized, both diaphragms are moved to the right while compressing another spring, so that the door 4 is moved to the full line position.

The operation of the solenoid valves $S_1$ to $S_7$ is controlled by the control output from a control circuit C including a microcomputer.

The command temperature Tso of the passenger compartment air is calculated in accordance with the following formula (1) stored in a ROM of the microcomputer, from the set temperature Ts which is adjustable by a driver through a restart resistance SP, ambient air temperature $T_A$ sensed by an ambient air temperature sensor SA, and the heat input Q by the sunshine detected by the sunshine sensor SF.

$$Tso = Ts - \alpha(T_A - 25) - \frac{2}{660} Q \quad (1)$$

The unit of the command temperature Tso and ambient air temperature $T_A$ is [°C.]. A constant $\alpha$ takes a value of 1/5 when the ambient air temperature $T_A$ is higher than 25° C. and 1/15 when the same temperature is below 25° C. The heat input Q [Kcal/h] is calculated on the assumption that a heat of 20 Kcal/h is inputted to the passenger compartment per 1° C. of difference between the temperature $T_Q$ detected by the sunshine sensor SF and the temperature $T_R$ of room air detected by the compartment air sensor $S_R$.

The command warm air temperature $Td_{Lo}$ of the warm air in the warm air duct *7b* is calculated in accordance with the following formulae (2) to (4), from the command temperature $T_{SO}$, ambient air temperature $T_A$, leg space temperature $T_L$ detected by a lower compartment air temperature sensor Sc and the temperature TdL detected by a sensor SE in the warm air duct *7b*.

$$T_{SOL} = T_{SO} + \frac{70 - Ta}{18} \quad (2)$$

where, $T_{soL}$ represents the command temperature of air in the leg space.

$$\Delta T_L = T_{SOL} - T_L \quad (3)$$

$$\Delta Td_{Lo} = 6\left(\Delta T_L + \frac{1}{680}\int \Delta T_L \cdot dt\right) + 30 \quad (4)$$

Note, however, that the $Td_{Lo}$ is assumed to be $Td_{Lo}=0°$ C. when $Td_{Lo}$ is equal to or lower than 0° C. and to be $Td_{Lo}=60°$ C. when the same is equal to or higher than 60° C.

Then, the command opening degree $\theta_L$ of the second air mix door *5c* for obtaining the command warm air temperature $Td_{Lo}$ is calculated by the following formulae (5) and (6):

$$\Delta Td_{Lo} = Td_{Lo} - Td_L \quad (5)$$

$$\theta_L = 3 \times \Delta Td_{Lo} + 15 \quad (6)$$

Note, however, that the angle $\theta_L$ is assumed to be $\theta_L=0°$ when the calculated $\theta_L$ is equal to or smaller than 0° and to be $\theta_L=30°$ when the same angle is equal to or greater than 30°. It is also assumed that the angle $\theta_L$ is 30° when the air conditioner operates in the defrosting mode. The opening degree of the door 5*c* is defined as 0° when the door takes the position shown by full line.

The present opening position of the door 5*c* is detected by a potentiometer PM2 and is compared with the command opening degree $\theta_L$. The door 5*c* is moved from the present position in either direction depending on the result of the comparison, and whether the solenoid valve $S_3$ is to be energized or not is determined depending on the direction of movement of the door 5*c*.

For instance, assuming that the judgement is made to reduce the opening degree of the door 5*c* from the present opening shown by broken line, at first the solenoid valve $S_3$ is de-energized and then the solenoid valve $S_4$ is de-energized. Consequently, the vacuum which has been applied to the diaphragm is vented to the atmosphere so that the door 5*c* is moved towards the heater core. The change of opening degree of the door 5*c* is detected momentarily by the potentiometer PM2 and is stored in a writable and erasable memory RAM in the microcomputer. A comparison is made periodically between the instant opening degree and the command opening degree and, when both opening degrees coincide with each other, the solenoid valve $S_4$ is energized to fix the door 5*c* at this position.

To the contrary, when the judgment is made to demand a greater degree of opening from the present opening degree, at first the solenoid valve $S_3$ is energized and then the solenoid valve $S_4$ is de-energized. Consequently, the vacuum is applied to the diaphragm so that the door 5*c* is pulled towards the actuator. As the opening degree of the door 5*c* reaches the command opening degree, the solenoid valve $S_4$ is energized while the solenoid valve $S_3$ is de-energized to fix the door 5*c* at the instant position.

Meanwhile, the command chilled air temperature $Td_{UO}$ in the chilled air duct *7a* is calculated in accordance with the following formulae (7) to (9), from the command temperature $T_{so}$, ambient air temperature $T_A$ upper body air temperature $T_U$ detected by an upper room air temperature sensor $S_B$ and the chilled air temperature $T_{du}$ in the chilled air duct *7a* detected by a sensor SD in that duct *7a:*

$$T_{SOU} = T_{so} + \frac{Ta - 70}{18} \quad (7)$$

where, $T_{SOU}$ represents the upper body air temperature command value.

$$\Delta T_U = T_{SOU} - T_U \quad (8)$$

$$Td_{UO} = 3\left(\Delta T_U + \frac{1}{680}\int \Delta T_U \cdot dt\right) + 15 \quad (9)$$

Note, however, that the command value $Td_{Uo}$ of chilled air is assumed to be $Td_{Uo}=0°$ C. when this temperature is equal to or lower than 0° C. and to be $Td_{Uo}=30°$ C. when this temperature is equal to or greater than 30° C. Then, the command opening degree $\theta_U$ of the first air mix door 5a for attaining the command temperature $Td_{Uo}$ of chilled air is determined in accordance with the following formulae (10) and (11).

$$\Delta Td_{Uo}=Td_{Uo}-Td_U \quad (10)$$

$$\theta_U=3\times\Delta Td_{Uo}+15 \quad (11)$$

Note, however, that the opening degree $\theta_U$ is assumed to be $\theta_U=0°$ when this angle $\theta_U$ is equal to or smaller than 0° and to be $\theta_U=30°$ when this angle $\theta_U$ equals to or greater than 30°. It is also assumed that, in the defrosting mode, the angle $\theta_U$ equals to 30°.

The opening degree of the door 5a is defined as being 0° when the door 5a takes the position shown by full line. The instant opening position of the door 5a is detected by the potentiometer PM1 and is compared with the command opening degree $\theta_U$. The direction of movement of the door 5a is determined in accordance with the result of the comparison. Whether the solenoid valve $S_1$ is to be energized or not is determined according to the thus determined direction of movement of the door 5a.

For instance, in the case where the demand is for reducing the opening degree from the instant position shown by broken line, at first the solenoid valve $S_1$ is de-energized and then the solenoid valve $S_2$ is de-energized. In consequence, the vacuum which has been applied to the diaphragm is leaked to the atmosphere, so that the door 5a is moved towards the heater core. The changing opening degree of the door 5a is momentarily detected by the potentiometer PM1 and is stored in a writable erasable memory RAM in the microcomputer.

A periodical comparison is made between the instant opening degree stored in the RAM and the command opening degree, and the microcomputer gives an instruction, when a coincidence is obtained, to make the control circuit C issue a control output for energizing the solenoid valve $S_2$. The door 5a is stopped at the instant position as the solenoid $S_2$ is energized.

Consequently, the chilled air discharged from the chilled air outlet 20 adjacent to the upper half part of the driver's body and the warm air coming out of the warm air outlet 21 adjacent to the legs of the driver are controlled to have desired temperatures in accordance with the set temperature, i.e. the command compartment temperature.

When the command opening degree $\theta_L$ of the second air mix door 5c read in the RAM of the microcomputer comes to take a value equal to or greater than 25° or when the operation mode is switched to the defroster mode, the control circuit C issues a control output for deenergizing the solenoid valve $S_5$ in accordance with the instruction given by the microcomputer. As the solenoid valve $S_5$ is de-energized, the control door 5b is moved to the position shown by broken line so that the warm air outlet surface of the heater core wholly opens to the warm air duct 7b.

The microcomputer delivers an instruction to the control circuit C to make the latter issue a control output for energizing the solenoid valves $S_6$ and $S_7$, when the condition expressed by the following formula (12) is met by the instant values of the room air temperature TR detected by the room air temperature sensor SR and written in the RAM of the microcomputer, command room air temperature $T_{so}$ and the command opening degree $\theta_U$ of the first air mix door 5a. As a result, the door 4 is switched to permit the sucking of the room air.

$$T_R \geqq T_{so} \text{ and } \theta_U=0° \quad (12)$$

Also, when the following conditions are met by the above-mentioned values, the control circuit C issues a control output for energizing the solenoid valve $S_6$ while de-energizing the solenoid valve $S_7$, in accordance with the instructions given by the microcomputer. Consequently, the door 4 is moved to an intermediate position where it permits the introduction of both of ambient air and the compartment air at the substantially equal rate.

$$\text{(a) } T_R<T_{so} \text{ and } \theta_U=0° \quad (13)$$

$$\text{(b) } \theta_U\neq0° \text{ and } T_{so}<T_R \quad (14)$$

Furthermore, the microcomputer delivers an instruction to make the control circuit C issues a control output for de-energizing both of the solenoid valves $S_6$ and $S_7$ when the following condition is met by the above-mentioned values so that the door 4 is switched for introduction of the ambient air.

$$\text{(a) } \theta_U\neq0° \text{ and } T_{so}>T_R \quad (15)$$

(b) When the compressor is stopped.

(c) In the defrosting mode.

Furthermore, the control circuit C issues an output in accordance with an instruction given by the microcomputer to control the voltage applied to the fan motor 1 to control the air flow rate and start and stop of the fan in accordance with the condition shown in Table 1 below.

TABLE 1

| Condition | Voltage |
|---|---|
| (1) $(T_R - T_{so}) \leqq -5$[°C.] | 10[V] |
| (2) $-5$[°C.] $\leqq (T_R - T_{so}) \leqq -2$[°C.] | $(T_{so} - T_R) \times 2$[V] |
| (3) $-2$[°C.] $\leqq (T_R - T_{so}) \leqq 5/3$[°C.] | 4[V] |
| (4) $5/3$[°C.] $\leqq (T_R - T_{so}) \leqq 5$[°C.] | $(T_R - T_{so}) \times \frac{12}{5}$ [V] |
| (5) 5[°C.] $\leqq (T_R - T_{so})$ | 12[V] |
| (6) Within 10 ± 2 seconds after start up | Voltage increased gradually from 4[V] to 12[V] |
| (7) Cooling water temp. below 35° C. $T_R < T_{so}$ | Zero |
| (8) Defroster mode | 12[V] |
| (9) 5 minutes after start up | Lowered from 12[V] to 8[V] |

Also, the control circuit C effects the control of start and stop of the refrigerator (compressor) in a manner shown in Table 2 below, in accordance with an instruction given by the microcomputer.

TABLE 2

| Condition | State of control |
|---|---|
| (1) $(T_{so} - T_A) > 15$[°C.] and $(T_s - T_R) > 0$ | Stop |
| (2) $T_A < 5$[°C.] | Stop |
| (3) Blower motor stopped | Stop |
| (4) 20 seconds after stopping | Restart and stop |

Also, the state of a hot water valve is controlled in a manner shown in Table 3 below by the control output from the control circuit C in accordance with the instruction given by the microcomputer.

3

| Condition | State |
|---|---|
| (1) Cooling water temp. above 35° C. and all of following conditions met $T_R > T_{so}$ $T_A > T_s$ $\theta_L \neq 0$° C. | Open |
| (2) Defroster mode | Open |

In the embodiment of the invention described hereinabove, the opening degrees of the first and second air mix doors 5*a*, 5*c* are controlled to follow up command values which are calculated from independent formulae programmed in the microcomputer, in accordance with the set temperature (command passage or compartment temperature $T_{so}$) and various other temperature information.

Figure 3:
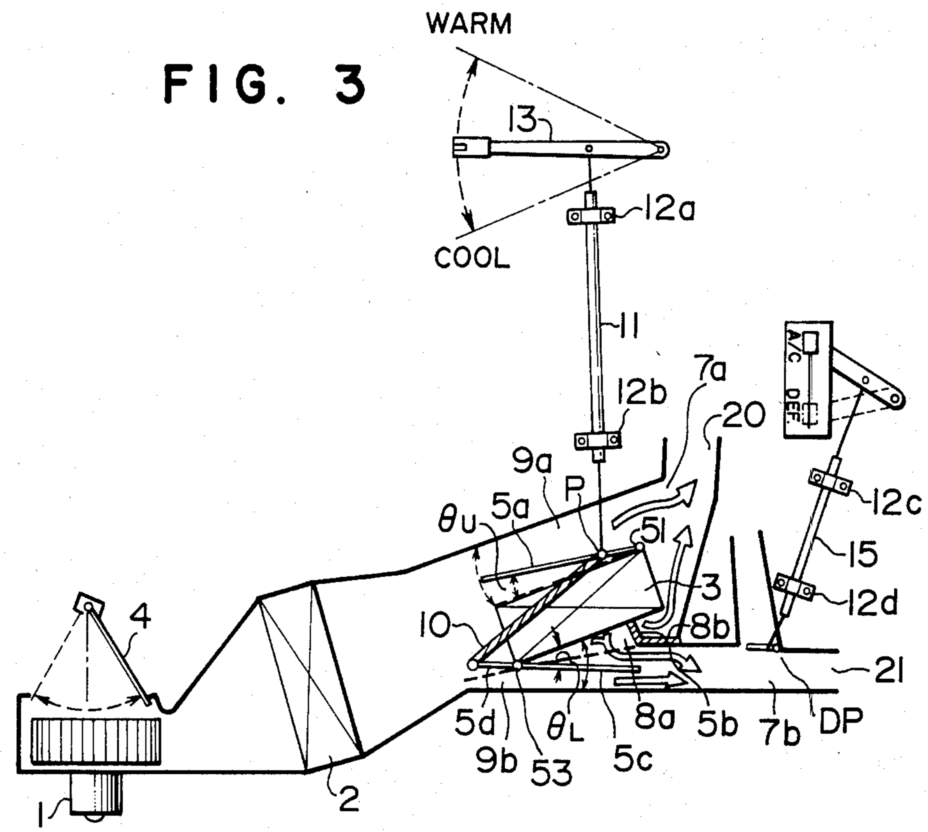
FIG. 3 shows an automobile air conditioner constructed in accordance with a second embodiment of the invention.

The air conditioner of the invention, however, can be embodied in such a form that the first and the second air mix doors 5*a*, 5*c* are operatively connected to each other mechanically so that the temperatures of air coming out from the chilled air outlet and warm air outlet are controlled while maintaining a constant temperature difference therebetween by the operation of a single control lever, as will be understood from the following description of FIG. 3.

As shown in FIG. 3*a* connecting wire 11 is connected at its one end to the first air mix door 5*a* and at its other end to a control lever 13 provided on a control panel. The arrangement is such that the opening degree $\theta_U$ of the first air mix door 5*a* is increased to decrease the passage area of the main chilled air passage 9*a* as the control lever 13 is moved toward the WARM side. To the contrary, when the lever 13 is operated toward the COOL side, the area of the main chilled air passage is increased. The connecting wire 11 is clamped by a pair of clamp members 12*a* and 12*b*.

A link mechanism 10 is rotatably connected at its one end to the first air mix door 5*a*. A lever 5*d* strongly fixed to the shaft 53 of the second air mix door 5*c* extends to the opposite side of the shaft to the door. The other end of the link mechanism 10 is rotatably connected to the end of the lever 5*d*.

Therefore, as the control lever 13 is operated in a direction for increasing the angle $\theta_2$ of the first air mix door 5*a*, the second air mix door 5*c* is also moved to increase the angle $\theta_L$.

Namely, the point P of connection between the link 10 and the first air mix door 5*a* is moved along an arcuate path upwardly around the axis of rotation of the shaft 51. In consequence, the other end of the link 10 pulls the end of the lever 3*d* upwardly. Since the lever 5*d* is fixed to the shaft 53, the shaft 53 is rotated clockwise as the end of the lever 5*d* is pulled upward, so that the second air mix door 5*c* fixed to the shaft 53 is rotated downwardly as viewed in the drawings around the axis of the shaft 53. Consequently, the second air mix door 5*c* is controlled to an opening degree corresponding to the opening degree of the first air mix door 5*a*.

Figure 4:
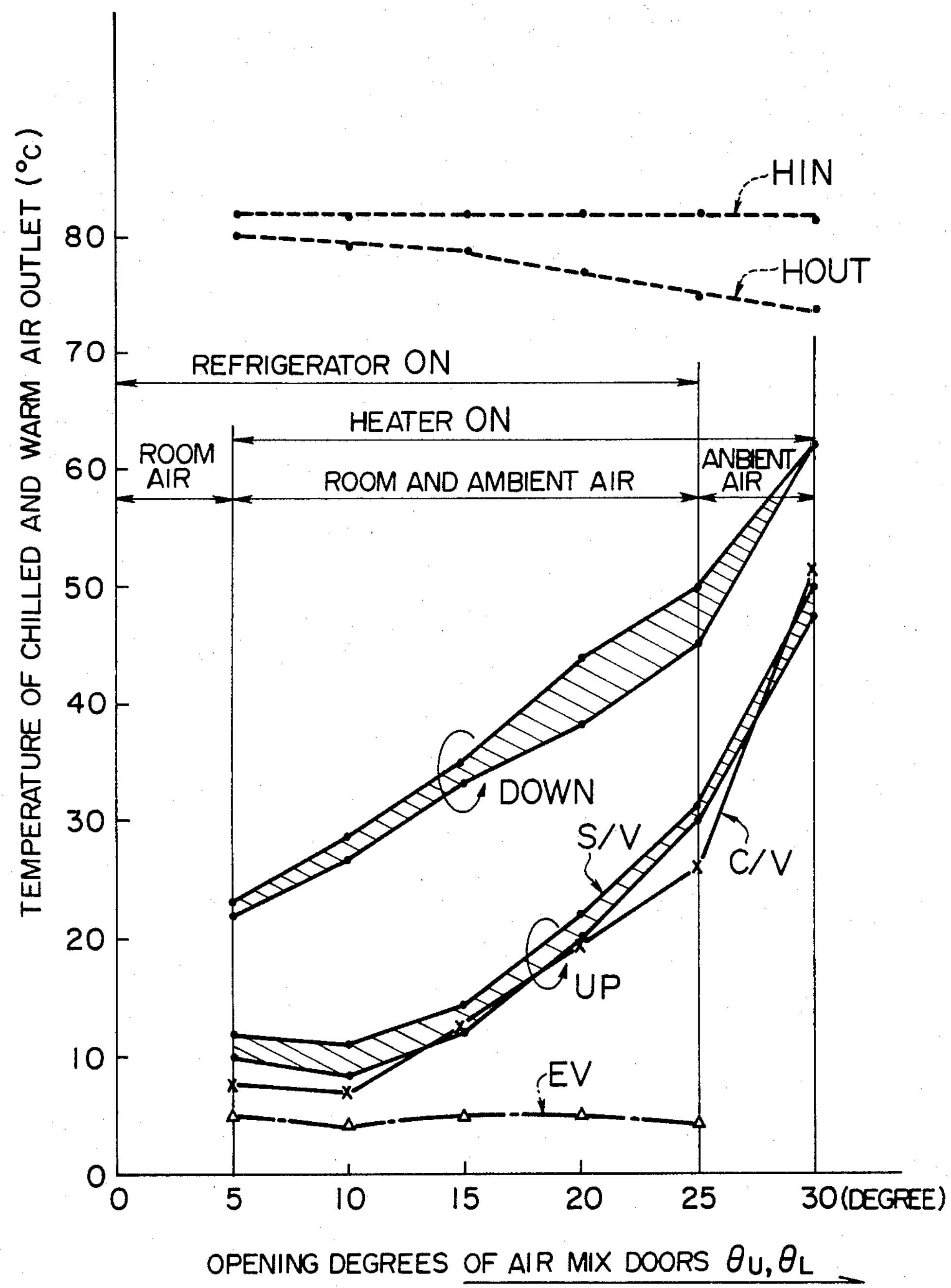
FIG. 4 is a chart for explaining a chilled air controlling characteristics of the embodiment shown in FIG. 3.

FIG. 4 shows experimental data showing the change of the temperatures of air at the upper chilled air outlet 20 and the lower warm air outlet 21, in relation to the change in the opening degrees $\theta_U$ and $\theta_L$.

In FIG. 4, the axis of ordinate represents the temperature °C. while the axis of abscissa represents the angle of opening $\theta_U$ and $\theta_L$ of the first and second air mix doors assuming that the positions of doors shown by broken lines correspond to opening degree 0°.

A curve HIN shows the air temperature at the heater inlet, while HOUT shows the change of temperature at the heater outlet. The curve DOWN shows the change of temperature of controlled air comining out of the lower warm air outlet, while the curve UP shows the temperature change of the controlled air coming out of the upper warm air outlet.

The curve S/V shows the temperature change of the conditioned air discharged from side vents provided at both ends of the instrument panel of the automobile, while C/V shows the change of the temperature of conditioned air discharged from a center vent provided at the central portion of the instrument panel. Finally, the curve EV shows the chilled air temperature at the outlet side of the evaporator. It is assumed here that no supply of hot water is made to the heater core 3 but the refrigerator operates solely when the opening degrees of both air mix doors 0° and 5° fall within the ranges of between 5*a* and 5*c*. In this range of operation, the door 4 has been switched for the introduction of passenger compartment air.

The supply of hot water to the heater core 3 is commenced as the opening degrees of the air mix doors 5*a* and 5*c* are increased beyond 5° and, at the same time, the door 4 is switched to the position where it permits the introduction of both of ambient air and the compartment air substantially at an equal flow rate.

In this range, a part of the chilled air chilled by the refrigerator is heated again by the heater core 3 and the larger part of the heated warm air is introduced into the warm air duct 7*b* through the main warm air passage 8*a* while the other part is introduced into the chilled air duct 7*a* through the sub-warm air passage 8*b*.

A part of the chilled air is introduced directly through the sub-chilled air passage 9*b* into the warm water duct 7*b* so as to be mixed with the warm air flowing therethrough, and the warm air as the mixture is discharged to the space around the driver's legs through the warm air outlet 21. On the other hand, a part of the warm air is introduced into the chilled air duct 7*a* into which the major part of the chilled air is also introduced through the main chilled passage 9*a*. The chilled air as the mixture is then discharged towards the upper half part of the driver's body through the chilled air outlet 20.

While the opening degrees of the air mix doors 5*a* and 5*c* are small, the flow rates of chilled air introduced into respective ducts 7*a* and 7*b* are comparatively large, so that the temperatures of conditioned air discharged from the outlets 20 and 21 are 10° to 12° C. and 22° to 23° C., respectively.

As the opening degrees of the air mix doors 5*a* and 5*c* are increased, the rate of the supply of chilled air into the heater core 3 is increased while the rate of introduction of chilled air into the ducts 7*a* and 7*b* is decreased. Consequently, the temperatures of the conditioned air from the air outlets 20 and 21 are raised as shown in FIG. 4.

As the opening degree of the air mix doors 5*a* and 5*c* is increased beyond 25°, the refrigerator or evaporator 2 is stopped and the door 4 is switched for the introduction of ambient air.

Therefore, when the air mix doors 5*a* and 5*b* are controlled in the opening region exceeding 25°, fresh ambient air is introduced into the main and sub-chilled air passages 9*a* and 9*b* so that the warm air is mixed in the ducts 7*a* and 7*b* with the fresh ambient air and the mixtures are discharged through respective air outlets 20 and 21.

The rate of introduction of the fresh ambient air is extremely small in this state as compared with the flow rate of the warm air, so that the air outlet temperatures are increased drastically as shown in FIG. 4.

Provided that the speed of the fan is maintained constant, the rate of discharge of conditioned air from the cold air outlet is increased as the opening degrees of the air mix doors 5*a* and 5*c* approach 0° and, to the contrary, the flow rate of the air from the air outlet 21 is increased as the opening degrees approach 30°.

In the described embodiment, the speed of the fan is maximized when the opening degrees of both air mix doors 5*a* and 5*c* are less than 5° and more than 25°, and is minimized when the opening degrees fall within the range of between 12.5° and 17.5°. Within the ranges of between 5° and 12.5° and between 17.5° and 25°, the speed of the fan is gradually dcreased as the opening degrees approach 12.5° and 17.5°, respectively.

Therefore, as the opening degrees of the doors 5*a* and 5*c* approach 5°, the flow rate of chilled air from the air outlet 20 is increased whereas, when the opening degrees approach 25°, the flow rate of air from the air outlet 21 is increased to impart a stronger feel of cooling and heating while maintaining an effect of keeping the head cool and the feet warm.

The total air flow rate is decreased as the opening degrees of the doors 5*a* and 5*b* approach the range of between 12.5° and 17.5°. When the opening degrees of both doors 5*a* and 5*c* take values between 12.5° and 17.5°, air flows at small rates from the air outlets 20 and 21 with a suitable temperature difference of, for example, 15° C. therebetween. It is thus possible to obtain a sufficient effect of keeping the head cool and the feet warm, although the air flow rate is small.

As has been described, according to the first embodiment of the invention, a part of the warm air is introduced into the chilled air duct leading to the upper air outlet opening in the upper part of the room space, and the rate of introduction of chilled air into the chilled air duct is controlled by a first air mix door. At the same time, a part of chilled air is introduced into the warm air duct leading to a lower air outlet opening to the lower part of the room space and the rate of supply of chilled air into the warm air duct is controlled by means of a second air mix door 5*c*. It is, therefore, possible to control the temperatures of air discharged from the upper and lower air outlets while realizing a desired temperature difference therebetween and, accordingly, to obtain an ideal effect of keeping the head cool and the feet warm.

According to another embodiment of the invention, the opening degree of the second air mix door 5*c* is controlled in accordance with the opening degree of the first air mix door 5*a*. It is, therefore, possible to maintain a suitable temperature difference between the air discharged from the upper air outlet and the air discharged from the lower air outlet.

According to still another form of the invention, the heater core 3 is disposed in a duct A such that the chilled air inlet surface and the warm air outlet surface of the heater core 3 extend substantially in parallel with the inner surfaces of the walls of the duct A. The first air mix door 5*a* is disposed between the chilled air inlet surface of the heater core 3 and the opposing wall surface of the duct A, while the second air mix door is disposed in the space between the warm air outlet surface of the heater core 3 and the opposing wall surface of the duct A. It is, therefore, possible to control the temperatures of chilled air and warm air discharged from the upper and lower air outlets, simply by changing the opening degrees of the air mix doors 5*a*, 5*c* only slightly. Although two air mix doors 5*a*, 5*c* were employed, the volume of the air conditioner as a whole was not increased substantially.

What is claimed is:

1. An automobile air conditioner in which a warm air heated by a heater core and a cold air by-passing said heater core are mixed at a controlled ratio to provide conditioned chilled air and conditioned warm air, the conditioned chilled air being discharged to an upper part of a passenger compartment through an upper air outlet while the conditioned warm air is discharged to a lower part of the compartment through a lower air outlet, comprising: a main chilled air passage means and a sub-chilled air passage means for by-passing said heater core; an evaporator upstream of both of said main chilled air passage means and said sub-chilled air passage means; a main warm air passage means and a sub-warm air passage means for distributing warm air coming out of said heater core at a suitable ratio; a first duct means for mixing chilled air from said main chilled air passage means and the warm air from said sub-warm air passage means, said first duct means being adapted to introduce the mixture to said upper air outlet; a second duct means for mixing the chilled air from said sub-chilled air passage means and the warm air from said main warm air passage means, said second duct means being adapted to introduce the mixture to said lower air outlet; a first air mix door for controlling the ratio between the flow rate of chilled air introduced into said heater core and the flow rate of chilled air flowing into said main chilled air passage means, said first air mix door being on the inlet side of the heater core and disposed at a branching point of the main chilled air passage means and a passage for air flowing into the heater core and reciprocally controlling an opening area of the main chilled air passage means and an opening area for the heater core from zero to maximum; and a second air mix door for controlling the ratio of mixing of the chilled air flowing from said sub-chilled air passage means into said second duct means and the warm air flowing from said main warm air passage means into said second duct means, said second air mix door being on the outlet side of the heater core and disposed at a meeting point of the main warm air passage means and the sub-chilled air passage means and reciprocally controlling an opening area of the main warm air passage means and an opening area of the sub-chilled air passage means from zero to maximum.

2. An automobile air conditioner as claimed in claim 1, wherein said first air mix door is rotatably disposed at an end of the side surface of said heater core facing said main chilled air passage means and adjacent to the chilled air inlet surface of the heater core, while said second air mix door is rotatably disposed on an end of the side surface of said heater core facing said sub-chilled air passage means and adjacent to the outlet end of said heater core.

3. An automobile air conditioner as claimed in claim 1, characterized by further comprising a control door disposed at an outlet side of said heater core and adapted to control the ratio of distribution of warm air from said heater core to said main and sub-warm air passage means.

4. An automobile air conditioner as claimed in claim 1, further comprising two control lever means mounted on a control panel for said air conditioner disposed on an instrument panel of the front part in the passenger compartment of said automobile, one of said lever means being connected to said first air mix door through a wire and a link mechanism, while the other of said lever means is connected to said second air mix door through a wire and a link mechanism.

5. An automobile air conditioner as claimed in claim 1, characterized by further comprising an upper air temperature setting means for setting the air temperature at the upper part of the passenger compartment of said automobile, an upper air temperature detecting means adapted to detect the air temperature in said upper part of the passenger compartment, a first controlling means adapted to control said first air mix door in such a manner as to make the difference between the set temperature signal of said upper air temperature setting means and the detected air temperature signal from said upper air temperature detecting means fall within a predetermined range, a lower air temperature setting means for setting the air temperature in the lower part of said passenger compartment, a lower air temperature detecting means adapted to detect the air temperature in said lower part of said passenger compartment, and a second controlling means adapted to control said second air mix door in such a manner as to make the difference between the set temperature signal from said lower air temperature setting means and the detected temperature signal from said lower air temperature detecting means fall within a predetermined range.

6. An automobile air conditioner as claimed in claim 1, further comprising a control lever means provided on a control panel, said control lever means being connected to said first air mix door through a wire and a link mechanism, said first and second air mix doors being linked to each other such that, when said first air mix door is operated by said control lever means in the direction for increasing the flow rate of chilled air flowing into said first duct means, said second air mix door is operated in the direction to increase the flow rate of chilled air flowing into said second duct means, whereas, when said first air mix door is controlled in the direction to decrease the flow rate of chilled air into said first duct means, said second air mix door is operated in the direction to decrease the flow rate of chilled air into said second duct means.

7. An automobile air conditioner as claimed in claim 1, further comprising: a temperature setting means for setting the air temperature in the passenger compartment space of the automobile, a temperature detecting means for detecting a representative temperature in said passenger compartment, a first controlling mechanism for controlling said first air mix door to control the temperature of the air discharged from said upper air outlet so as to make the difference between the set temperature signal from said temperature setting means and the detected temperature signal from said air temperature detecting means falls within a predetermined range, and a second controlling mechanism for controlling said second air mix door in accordance with the state of control of said first air mix door in such a manner as to make the difference between the temperature of air flowing out of said upper air outlet and the temperature of air flowing out of said lower air outlet fall within a predetermined range.

8. An automobile air conditioner as claimed in claim 1, further comprising: means for producing an electric signal corresponding to a set temperature; means for producing an electric signal corresponding to the passenger compartment air temperature; a first programming means for enabling a calculating of the opening degree of said first air mix door in accordance with at least the electric signals corresponding to the set temperature and the passenger compartment air temperature; a calculation operating means for calculating the opening degree of said first air mix door from said electric signals in accordance with the program in said first programming means; a second programming means for enabling a calculation of the opening degree of said second air mix door in relation to the opening degree of said first air mix door; a third programming means for enabling a determination of the opening degree of said second air mix door in accordance with the opening degree of said first air mix door; a program executing means for determining the opening degree of said second air mix door in accordance with the program in said third programming means; a first operating means for operating said first air mix door in accordance with the result of an operating performed by said program executing means; and a second operating means adapted to operate said second air mix door in accordance with a result provided by said program executing means.

9. An automobile air conditioner comprising: a heater core disposed in a duct such that the chilled air inlet surface of said heater core and the heated air outlet surface of said heater core are disposed in opposition to opposed walls of said duct with a first gap and a second gap being respectively formed between the air inlet surface and air outlet surface of the heater core and the opposed walls of said duct, an evaporator disposed in said duct upstream of said heater core, the first gap formed adjacent to said inlet surface of said heater core constituting a first chilled air passage means for by-passing said heater core, the second gap formed adjacent to said outlet surface of said heater core constituting a second chilled air passage means for by-passing said heater core, said first chilled air passage means being larger than said second chilled air passage means in cross section of passage; a first and a second warm air passage means for distributing warmed air coming out of said heater core at a suitable ratio of flow rate, said first warm air passage means being larger than said second warm air passage means in cross section of passage; a first duct means for mixing chilled air from said first chilled air passage means and the warm air from said second warmed air passage means with each other to form a conditioned chilled air, said first duct means being adapted to introduce said conditioned chilled air to an upper air outlet from which said conditioned chilled air is discharged to to an upper part of a passenger compartment of said automobile; a second duct means for mixing chilled air from said second by-pass passage means and the warm air from said first warm air passage means with each other to form a conditioned warm air, said second duct means being adapted to introduce said conditioned warm air is discharged to a lower part of said passenger compartment; a first air mix door for reciprocally controlling the ratio between the flow rate of the chilled air introduced to said heater core and the flow rate of the chilled air introduced into said first chilled air passage means, said first mixing door being disposed in said first gap; and a second air mix door for reciprocally controlling the ratio between the flow rate of the warm air flowing from said first warm air passage means into said second duct means and the flow rate of chilled air flowing from said second chilled air passage means into said second duct means.

* * * * *